(12) United States Patent
Caprioli

(10) Patent No.: US 7,020,748 B2
(45) Date of Patent: Mar. 28, 2006

(54) CACHE REPLACEMENT POLICY TO MITIGATE POLLUTION IN MULTICORE PROCESSORS

(75) Inventor: Paul Caprioli, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 284 days.

(21) Appl. No.: 10/348,796

(22) Filed: Jan. 21, 2003

(65) Prior Publication Data

US 2004/0143708 A1    Jul. 22, 2004

(51) Int. Cl.
*G06F 12/00* (2006.01)
*G06F 12/12* (2006.01)

(52) U.S. Cl. .................. 711/136; 711/118; 711/133; 711/159; 711/160

(58) Field of Classification Search ........... 711/117, 711/118, 133, 136, 134, 159, 160
See application file for complete search history.

(56) References Cited

U.S. PATENT DOCUMENTS

| | | | |
|---|---|---|---|
| 6,282,617 B1 | 8/2001 | Tirumala et al. | 711/133 |
| 6,378,041 B1 | 4/2002 | Tremblay | 711/125 |
| 6,643,742 B1 * | 11/2003 | Vidwans et al. | 711/136 |
| 6,715,035 B1 * | 3/2004 | Colglazier et al. | 711/118 |
| 6,823,427 B1 * | 11/2004 | Sander et al. | 711/136 |

OTHER PUBLICATIONS

"An Overview of the UltraSPARC© III Cu Processor—The UltraSPARC III Processor Moves to Copper Technology" Version 1.1, Sun Microsystems, Inc. Jun. 2002.

* cited by examiner

*Primary Examiner*—Gary Portka
*Assistant Examiner*—Jasmine Song
(74) *Attorney, Agent, or Firm*—Hamilton & Terrile, LLP; Stephen A. Terrile

(57) ABSTRACT

A method for identifying a least recently used cache entry in a cache. The method includes receiving a cache access request, determining whether the contents of the main memory address are present in the cache, associating, when the contents of the main memory address are not present in the cache, updating more significant bits of a pseudo least recently used pointer when the contents of the main memory address are not present in the cache, and updating more significant bits and less significant bits of the pseudo least recently used pointer when the contents of the main memory address are present in the cache. The cache access request is associated with a main memory address. The memory address has a set within the cache and the set includes a plurality of ways.

12 Claims, 4 Drawing Sheets

CACHE REPLACEMENT POLICY TO MITIGATE POLLUTION IN MULTICORE PROCESSORS

BACKGROUND OF THE INVENTION

1. Field of the Invention

The present invention relates to cache replacement policies, and more particularly, to cache replacement policies in multicore processors.

2. Description of the Related Art

A cache is used by a processor to temporarily store instructions and data. A factor in the performance of the processor is the probability that a processor requested item is already stored in the cache. When a processor attempts to access an item of information, it is either present in the cache or not. If present, a cache hit occurs. If the item is not in the cache when requested by the processor, a cache miss occurs. It is desirable when designing a cache system to achieve a high cache hit rate or hit ratio.

After a cache miss occurs, the information requested by the processor is retrieved from memory and brought into the cache so that the information may be accessed by the processor. A search for an item of information that is not stored in the cache after a cache miss usually results in a time-consuming effort to retrieve the item of information from the main memory of the system. To maximize the number of cache hits, data that is likely to be referenced in a near future operation of the processor is stored in the cache. Two common strategies for maximizing cache hits are storing the most recently referenced data and storing the most commonly referenced data.

A cache is subdivided into sets of cache line slots. When each set contains only one line, then each main memory line can only be stored in one specific line slot in the cache. This is called direct mapping. In contrast, each set in most modern processors contains a number of lines. Because each set contains several lines, a main memory line mapped to a given set may be stored in any of the lines, or "ways", in the set.

When a cache miss occurs, the line of memory containing the missing item is loaded into the cache, replacing another cache line. This process is called cache replacement. In a direct mapping system, each line from main memory is restricted to be placed in a single line slot in the cache. This direct mapping approach simplifies the cache replacement process, but tends to limit the hit ratio due to the lack of flexibility with line mapping. In contrast, flexibility of line mapping, and therefore a higher hit ratio, can be achieved by increasing the level of associativity. Increased associativity means that the number of lines per set is increased so that each line in main memory can be placed in any of the line slots ("ways") within the set. During cache replacement, one of the lines in the set must be replaced. The method for deciding which line in the set is to be replaced after a cache miss is called a cache replacement policy.

There are a number of conventional cache replacement algorithms for selecting a datum in the cache to overwrite including Least-Recently Used (LRU) and Pseudo-LRU. In a two-way system, a single bit per line is used to implement an LRU algorithm. When a cache hit occurs, the way which was hit assures that an LRU bit is written to point to another way. When a line is to be replaced, that line's LRU pointer already points to the way where the replacement should happen, and the pointer is rewritten to point at the other way. The power-up state of these bits is insignificant, since everything in the cache is unusable at a power-up.

An LRU replacement algorithm uses many bits of memory. For example, a four-way cache has LRU bits for each line to represent the 24 (4!) possible states of use of the cache contents. These 24 states require five bits ($2^5=32>24$) per cache line to encode. Similarly, an eight-way cache's LRU algorithm would require adequate bits to represent the 8! states of the use of the eight ways of the cache. This amounts to 40,320 states, requiring 16 bits of LRU information per cache line. A 16-Way cache line would require 45 bits per cache line.

With the pseudo-LRU replacement algorithm, three bits are used for a 4-way cache line. The top bit in a tree is set when there is a hit in one half of the cache, and is cleared upon a hit in the other half of the cache. Only one of the bits in the second level of the tree is set or cleared on a cache hit. The pseudo-LRU algorithm can be implemented as write only; a simple write cycle updates the pseudo-LRU bits during cache hits. This can essentially double the speed with which the replacement bits can be updated over the speed of a true LRU algorithm.

SUMMARY OF THE INVENTION

In one embodiment, the invention relates to a method for identifying a least recently used cache entry in a cache. The method includes receiving a cache access request, determining whether the contents of the main memory address are present in the cache, associating, when the contents of the main memory address are not present in the cache, updating more significant bits of a pseudo least recently used pointer when the contents of the main memory address are not present in the cache, and updating more significant bits and less significant bits of the pseudo least recently used pointer when the contents of the main memory address are present in the cache. The cache access request is associated with a main memory address. The memory address has a set within the cache and the set includes a plurality of ways.

In another embodiment, the invention relates to an apparatus for identifying a least recently used cache entry in a cache. The apparatus includes means for receiving a cache access request; means for determining whether the contents of the main memory address are present in the cache; means for associating, when the contents of the main memory address are not present in the cache, means for updating more significant bits of a pseudo least recently used pointer when the contents of the main memory address are not present in the cache, and means for updating more significant bits and less significant bits of the pseudo least recently used pointer when the contents of the main memory address are present in the cache. The cache access request is associated with a main memory address. The memory address has a set within the cache and the set includes a plurality of ways.

In another embodiment, the invention relates to a multi-core processor. The multi-core processor includes a first processor core, a second processor core, a cache coupled to the first processor core and the second processor core. The cache includes a cache controller for identifying a least recently used cache entry in the cache. The cache controller includes a pseudo least recently used pointer and a pointer update mechanism. The pointer update mechanism receives a cache access request from one of the first processor core and the second processor core, determines whether the contents of the main memory address are present in the cache, associates when the contents of the main memory address are not present in the cache, updates more significant bits of a pseudo least recently used pointer when the contents of the main memory address are not present in the cache, and updates more significant bits and less significant bits of the pseudo least recently used pointer when the contents of the main memory address are present in the cache. The cache access request is associated with a main memory address. The memory address has a set within the cache. The set includes a plurality of ways.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
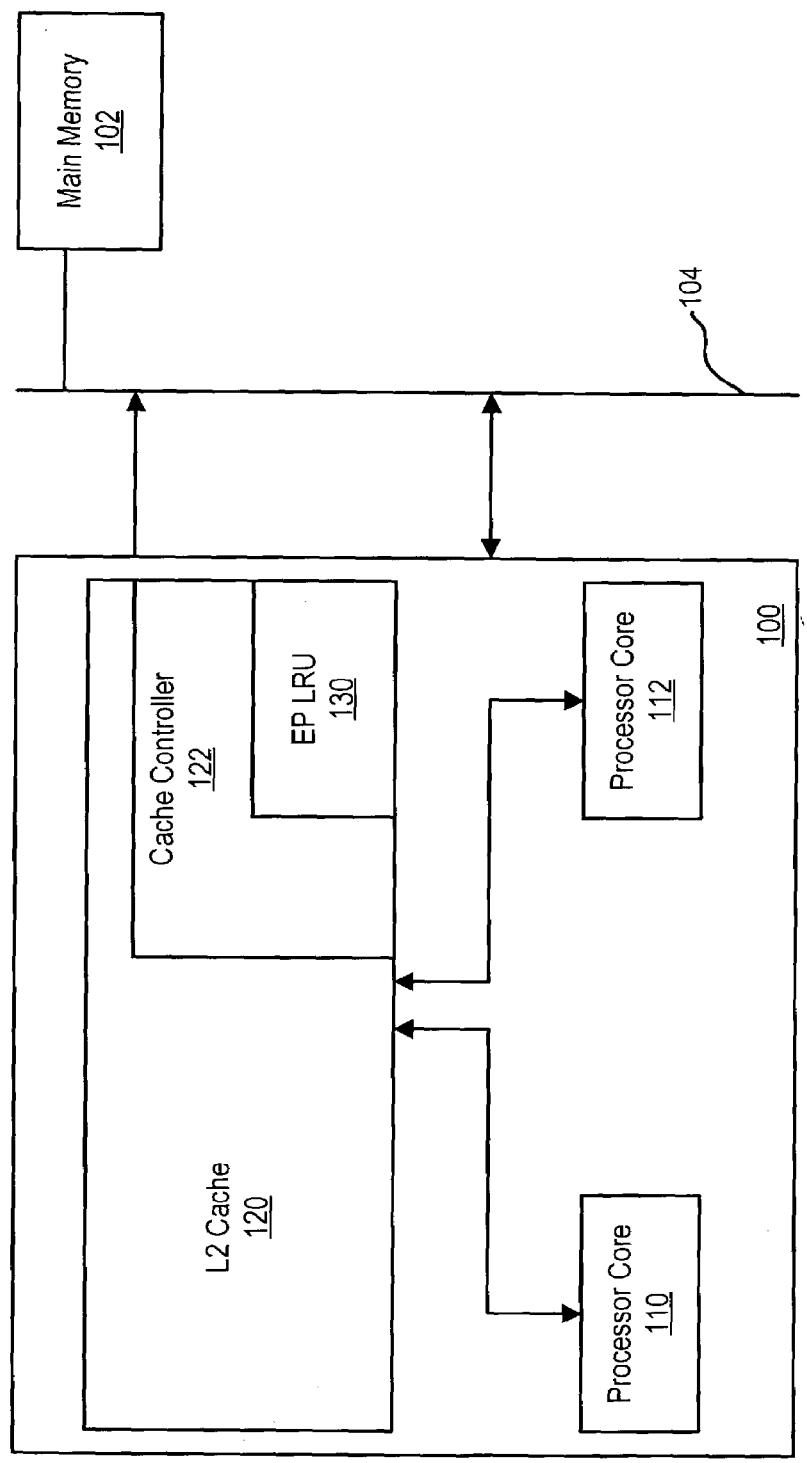
FIG. 1 shows a block diagram of a multicore processor.

Referring to FIG. 1 a block diagram of a multicore processor 100 is shown. Processor 100 is coupled to main memory 102 via bus 104. Processor 100 includes processor core 110 and processor core 112. Processor cores 110 and 112 share a level 2 cache 120. Level 2 cache 120 includes cache controller 122 which includes an enhanced pseudo least recently used replacement module 130. The cache controller 122 includes a pseudo least recently used pointer as well as a pointer update mechanism. The pointer update mechanism includes an enhanced pseudo LRU replacement algorithm. Cache 120 is, e.g., an 8-way set associative cache.

Figure 2:
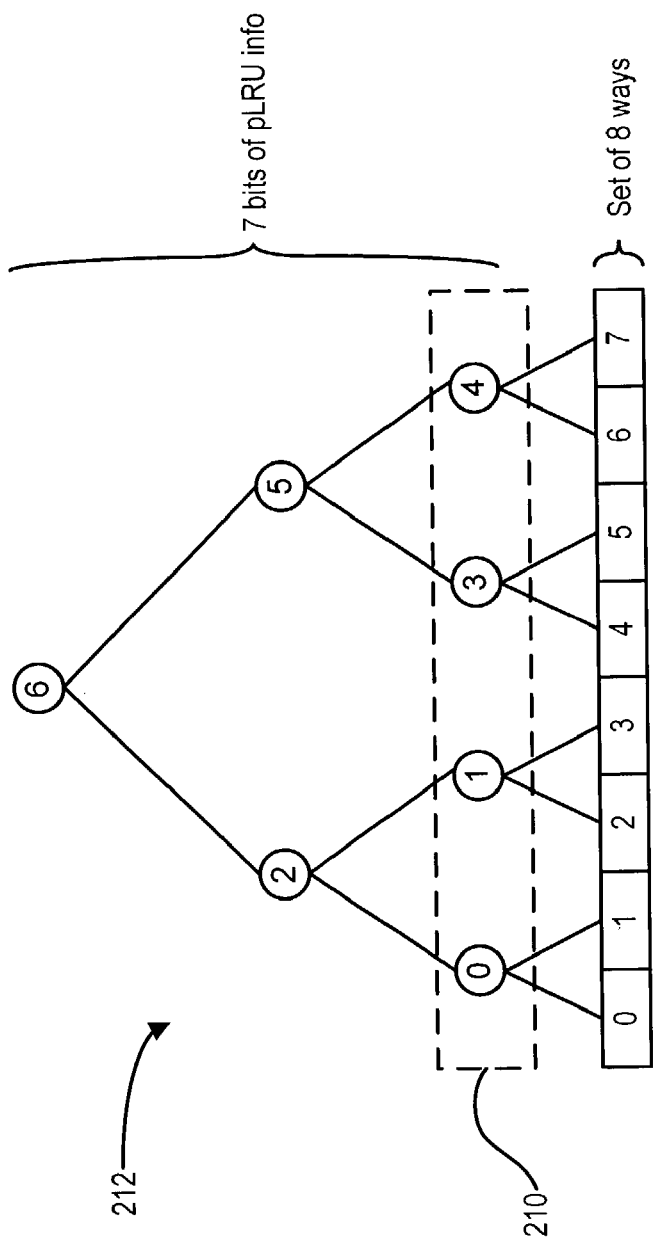
FIG. 2 shows a block diagram of a replacement tree of an enhanced pseudo LRU replacement algorithm for an 8-way cache.

Referring to FIG. 2, a block diagram of a replacement tree of an enhanced pseudo LRU replacement algorithm is shown. The enhanced pseudo LRU replacement algorithm interacts with the enhanced pseudo LRU pointer. Each set of the cache has an associated 7-bit enhanced pseudo LRU pointer. More specifically, bit 0 of the pointer points to one of set 0 or set 1. Bit 1 of the pointer points to one of set 2 or set 3. Bit 3 of the pointer points to one of set 4 or set 5. Bit 4 of the pointer points to one of set 6 or set 7. Bit 2 of the pointer points to one of sets 0 and 1 or sets 2 and 3. Bit 5 of the pointer point to one of sets 4 and 5 or sets 6 and 7. Bit 6 of the pointer points to one of sets 0–3 or sets 4–7. Bits 0, 1, 3, and 4 provide pointers with the finest granularity, bits 2 and 5 provide pointers with the next finest granularity and bit 6 provides a pointer with the least granularity. Thus, bits 210 are the less significant pointer bits and bits 212 are the more significant pointer bits.

The pointers with the finest granularity 210 are used by the enhanced pseudo LRU replacement algorithm to take into account the multi-core nature of the processor and the effect that the multi-core nature of the processor may have on determining which cache entry to overwrite when replacing an entry of the cache 120.

Figure 3:
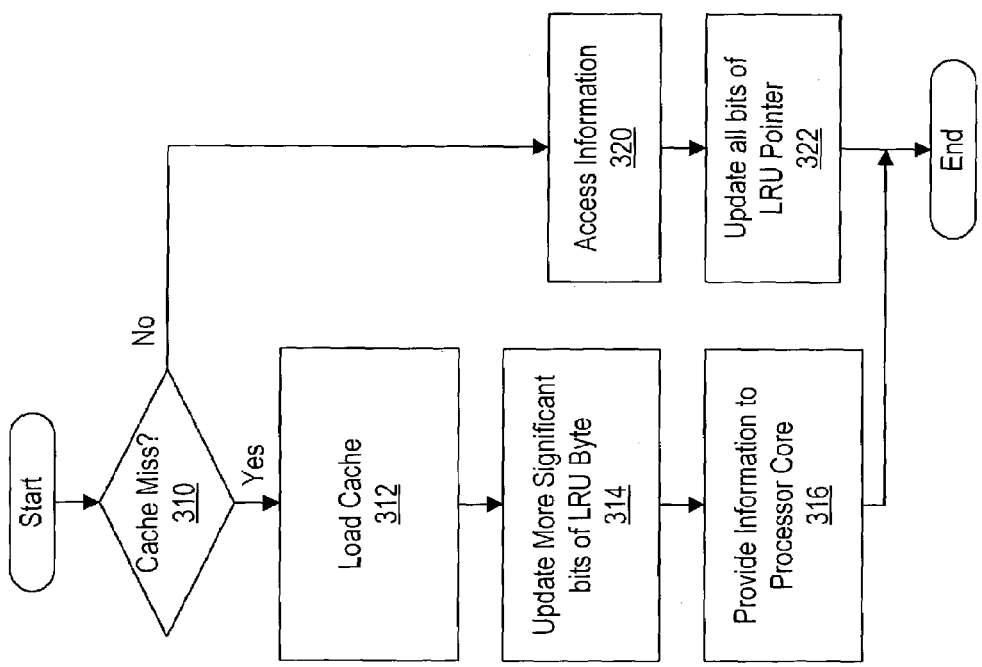
FIG. 3 shows a flow chart of the operation of the enhanced pseudo LRU replacement algorithm for a 16-way cache.

Referring to FIG. 3, in operation, when there is a call to the level 2 cache, the cache controller (e.g., via address tags) determines whether there is a cache miss at step 310. If there is a cache miss, then the information is loaded from the main memory 102 into the cache location indicated by the enhanced pseudo LRU pointer at step 312. The enhanced pseudo LRU module 130 then updates the more significant bits 212 (i.e., the bits with lesser granularity) of the enhanced pseudo LRU pointer at step 314. The information that was loaded from the main memory 102 is then provided to the processor core that made the call to the level 2 cache at step 316 and the cache operation ends. Accordingly, the way in which the information is subsequently loaded corresponds to a recently used pointer location that is not the most recently used location, but also not the least recently used location (the location is generally in the middle of the recently used hierarchy defined by the pointer).

If the cache controller 122 determines that there was not a miss at step 310, then there was a cache hit and the information is accessed within the cache at step 320. The enhanced pseudo LRU module 130 then updates all of the bits of the enhanced pseudo LRU pointer including the more significant bits 212 (i.e., the bits with lesser granularity) and the appropriate less significant bit 210 (i.e., the bits with the finest granularity) at step 322 and the cache operation ends. Accordingly, when there is a hit of a particular cache location, the way in which there was a hit now has the indication of the most recently used cache location.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Figure 4:
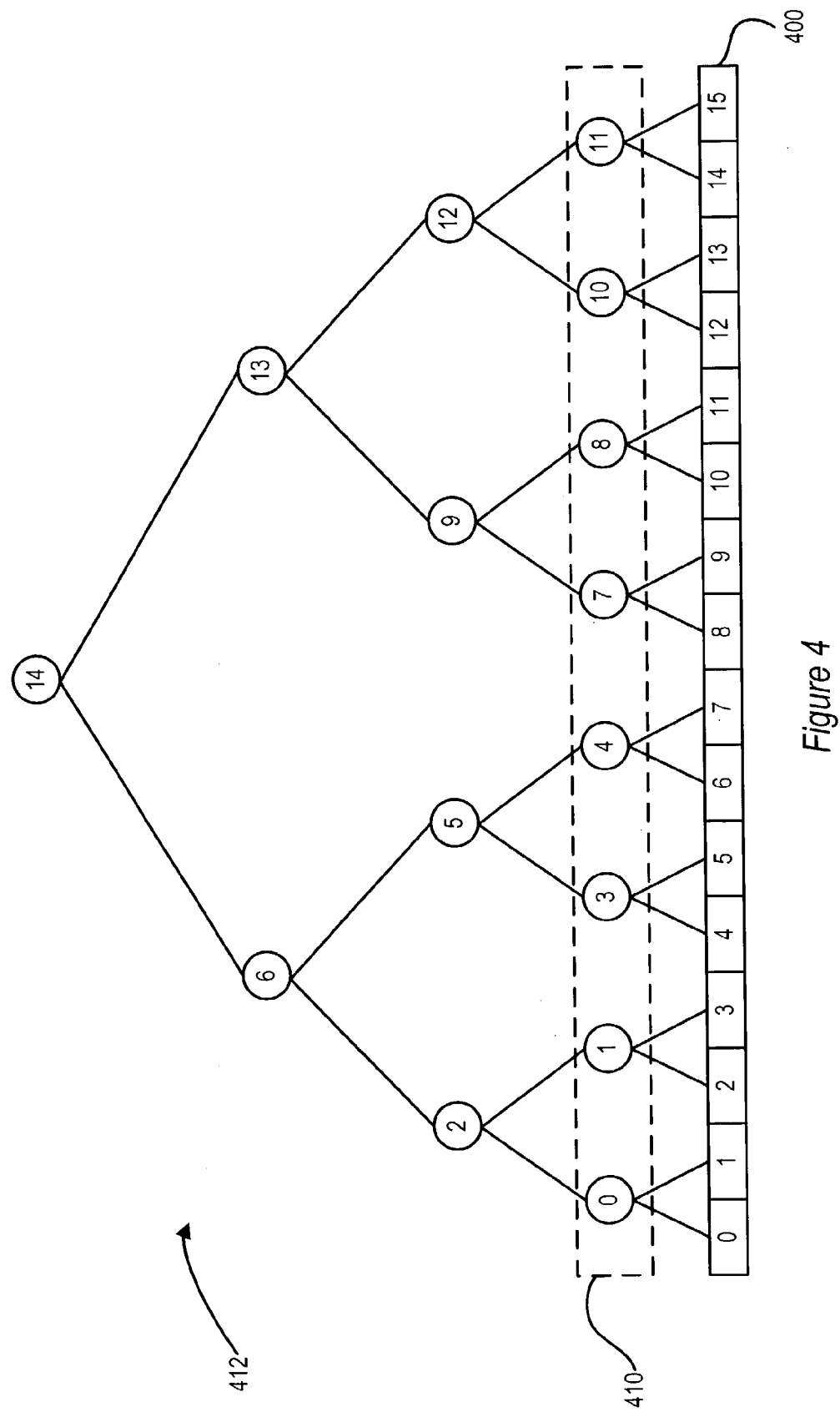
FIG. 4 shows a block diagram of an alternate replacement tree of an enhanced pseudo LRU replacement algorithm.

For example, the L2 cache 120 may have any number of ways, such as the 16 way cache shown in FIG. 4. Varying the number of ways affects the number of bits that are used for the enhanced pseudo LRU replacement algorithm, however, the pointers with the finest granularity are updated only on a cache hit and not on a cache miss. More specifically, each set of the cache includes an associated 15-bit enhanced pseudo LRU pointer. More specifically, bit 0 of the pointer points to one of set 0 or set 1. Bit 1 of the pointer points to one of set 2 or set 3. Bit 3 of the pointer points to one of set 4 or set 5. Bit 4 of the pointer points to one of set 6 or set 7. Bit 2 of the pointer points to one of sets 0 and 1 or sets 2 and 3. Bit 5 of the pointer point to one of sets 4 and 5 or sets 6 and 7. Bit 6 of the pointer points to one of sets 0–3 or sets 4–7. Bit 7 of the pointer points to one of set 8 or set 9. Bit 8 of the pointer points to one of set 10 or set 11. Bit 10 of the pointer points to one of set 12 or set 13. Bit 11 of the pointer points to one of set 14 or set 15. Bit 12 of the pointer points to one of sets 12 and 13 or sets 14 and 15. Bit 13 of the pointer points to one of sets 8–11 or sets 12–15. Bit 14 points to one of sets 0–7 or sets 8–15. Bits 0, 1, 3, 4, 7, 8, 10 and 11 provide pointer bits with the finest granularity, bits 2, 5, 9 and 12 provide pointer bits with the next finest granularity, bits 6 and 13 provide pointer bits with the next finest granularity and bit 14 provides a pointer bit with the least granularity.

The pointers with the finest granularity 410 are used by the enhanced pseudo LRU replacement algorithm to take into account the multi-core nature of the processor 100 and the effect that the multi-core nature of the processor 100 may have on determining which cache entry to overwrite when replacing an entry of the cache 120. Thus, bits 410 are the less significant pointer bits and bits 412 are the more significant pointer bits.

Also, for example, while the described embodiment sets forth two processor cores, it will be appreciated that the processor may have any number of processor cores. Also, while the preferred embodiment sets for the processor cores on the same die as the L2 cache, it will be appreciated that some or all of these modules may be located on separate dies.

Consequently, the invention is intended to be limited only by the spirit and scope of the appended claims, giving full cognizance to equivalents in all respects.

What is claimed is:

1. A method for identifying a least recently used cache entry in a cache, the cache being shared by at least two processor cores, the method comprising
    receiving a cache access request, the cache access request being associated with a main memory address;
    determining whether the contents of the main memory address are present in the cache;
    associating, when the contents of the main memory address are not present in the cache, the memory address with a set within the cache, the set including a plurality of ways;
    updating bits of a pseudo least recently used pointer having lesser granularity when the contents of the main memory address are not present in the cache; and
    updating bits of the pseudo least recently used pointer having lesser granularity and the finest granularity when the contents of the main memory address are present in the cache.

2. The method for identifying a least recently used cache entry of claim 1 wherein
    the cache includes eight ways; and
    the pseudo least recently used pointer includes seven bits.

3. The method for identifying a least recently used cache entry of claim 1 wherein
    the cache includes sixteen ways; and
    the pseudo least recently used pointer includes fifteen bits.

4. An apparatus for identifying a least recently used cache entry in a cache, the cache being shared by at least two processor cores, the apparatus comprising
    means for receiving a cache access request, the cache access request being associated with a main memory address;
    means for determining whether the contents of the main memory address are present in the cache;
    means for associating, when the contents of the main memory address are not present in the cache, the memory address with a set within the cache, the set including a plurality of ways;
    means for updating bits of a pseudo least recently used pointer having lesser granularity when the contents of the main memory address are not present in the cache; and
    means for updating bits of the pseudo least recently used pointer having lesser granularity and the finest granularity when the contents of the main memory address are present in the cache.

5. The apparatus for identifying a least recently used cache entry of claim 4 wherein
    the cache includes eight ways; and
    the pseudo least recently used pointer includes seven bits.

6. The apparatus for identifying a least recently used cache entry of claim 4 wherein
    the cache includes sixteen ways; and
    the pseudo least recently used pointer includes fifteen bits.

7. A cache controller for identifying a least recently used cache entry in a cache, the cache being shared by at least two processing cores, the cache controller comprising
    a pseudo least recently used pointer;
    a pointer update mechanism, the pointer update mechanism
        receiving a cache access request, the cache access request being associated with a main memory address,
        determining whether the contents of the main memory address are present in the cache;
        associating, when the contents of the main memory address are not present in the cache, the memory address with a set within the cache, the set including a plurality of ways;
    updating bits of a pseudo least recently used pointer having lesser granularity when the contents of the main memory address are not present in the cache; and
    updating bits of the pseudo least recently used pointer having lesser granularity and the finest granularity when the contents of the main memory address are present in the cache.

8. The cache controller 7 wherein
    the cache includes eight ways; and
    the pseudo least recently used pointer includes seven bits.

9. The cache controller of claim 7 wherein
    the cache includes sixteen ways; and
    the pseudo least recently used pointer includes fifteen bits.

10. A multi-core processor comprising:
    a first processor core;
    a second processor core;
    a cache coupled to the first processor core and the second processor core, the cache including a cache controller for identifying a least recently used cache entry in the cache, the cache controller including
        a pseudo least recently used pointer; and
        a pointer update mechanism, the pointer update mechanism
            receiving a cache access request from one of the first processor core and the second processor core, the cache access request being associated with a main memory address,
            determining whether the contents of the main memory address are present in the cache,
            associating, when the contents of the main memory address are not present in the cache, the memory address with a set within the cache, the set including a plurality of ways;
    updating bits of a pseudo least recently used pointer having lesser granularity when the contents of the main memory address are not present in the cache; and
    updating bits of the pseudo least recently used pointer having lesser granularity and the finest granularity when the contents of the main memory address are present in the cache.

11. The multi-core processor of claim 10 wherein
    the cache includes eight ways; and
    the pseudo least recently used pointer includes seven bits.

12. The multi-core processor of claim 10 wherein
    the cache includes sixteen ways; and
    the pseudo least recently used pointer includes fifteen bits.

* * * * *